May 30, 1967 — I. P. THOMPSON — 3,322,578
THERMOCHEMICAL DESURFACING METHOD
Filed Feb. 10, 1964 — 8 Sheets-Sheet 1
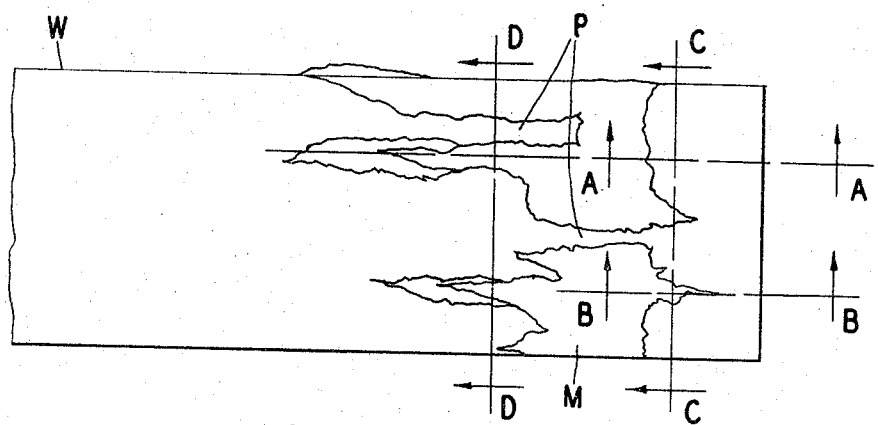
Fig. 1.
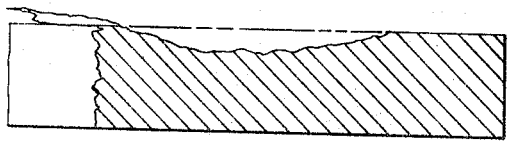 
Fig. 1a.     Fig. 1b.
 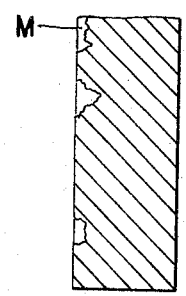
Fig. 1c.     Fig. 1d.
INVENTOR.
IVAN P. THOMPSON
BY Leo A. Plum, Jr.
ATTORNEY May 30, 1967   I. P. THOMPSON   3,322,578
THERMOCHEMICAL DESURFACING METHOD
Filed Feb. 10, 1964   8 Sheets-Sheet 3

INVENTOR.
IVAN P. THOMPSON
BY Leo A. Plumm, jr.
ATTORNEY

INVENTOR
IVAN P. THOMPSON

May 30, 1967 I. P. THOMPSON 3,322,578
THERMOCHEMICAL DESURFACING METHOD
Filed Feb. 10, 1964 8 Sheets-Sheet 6

INVENTOR
IVAN P. THOMPSON
BY Leo A. Plumb, Jr.
ATTORNEY

3,322,578
THERMOCHEMICAL DESURFACING METHOD
Ivan P. Thompson, Hillside, N.J., assignor to Union
Carbide Corporation, a corporation of New York
Filed Feb. 10, 1964, Ser. No. 343,726
7 Claims. (Cl. 148—9.5)

This invention relates to a thermochemical desurfacing of metal bodies and particularly to a method of initiating a desurfacing reaction on steel billets, blooms, slabs and the like.

The common practice in starting a thermochemical desurfacing reaction on a hot steel body is to first direct preheat flames against the steel surface for a predetermined period of time until a molten metal puddle or hot spot, as it is often termed, is formed. This is usually accomplished by feeding the steel into register with a scarfing unit and then directing a flow of preheat oxygen and fuel gas at a transverse area of the surface thereof. The ignited mixture of fuel gas and oxygen produces sheet-like flames which are maintained in striking contact with the surface of the steel until the hot spot is formed evenly thereacross. Once this has been formed, a sheet-like stream of high pressure cutting oxygen is turned on and directed toward the hot spot. Immediately thereafter the steel body is rapidly moved past the scarfing unit so that the cutting oxygen stream reacting with the molten metal or hot spot produces a continuous planing action along the length of the steel body.

In cold scarfing, an iron powder is injected into the preheat flames which raise the powder to its ignition temperature. As the powder comes in contact with the surface of the steel it is burned in the presence of excess preheat oxygen, generating sufficient heat to form the hot spot thereon. In cold scarfing, the flow of preheat oxygen is usually slightly greater than in hot scarfing but must be controlled to a value which will not tend to blow the powder off the surface of the steel. Normally, once the cutting oxygen flow is initiated and the steel movement brought up to scarfing speed, the flow of iron powder is cut off.

In order to condition a steel body having surface defects by thermochemical desurfacing, it is desirable to create an even planing effect over the entire length of the body. To avoid serious metal loss, it is also desirable to desurface a thin but even layer of the metal. From the start of the desurfacing pass at one end of the body to the opposite end thereof, a thin uniform depth of cut, free of gouges, is required.

This effect is often difficult to achieve regularly on a commercial basis because of the generally unpredictable quality of the surface to be scarfed. Not infrequently the steel to be scarfed has an irregular surface consisting of high and low spots resembling miniature hills and valleys. This irregularity may be the result of actual surface irregularity of the steel itself, but more commonly is the result of an uneven build-up of slag on the steel surface. The uneven surface conditions mentioned prevent the formation of a shallow and continuous molten puddle or hot spot across the width of the body. Instead, the sheet-like preheat flames often form one or more puddles across the width of the body which become separated by rising projections or high spots of slag. If the high pressure cutting oxygen was turned on at this point and the body brought up to scarfing speed, a width segment of the steel would be left unscarfed for the entire length of the body. Alternatively, if the preheating time period was increased sufficiently in order to melt down the high spots it would simultaneously melt a greater depth of metal over the remainder of the width of the body. This condition would cause a severe gouging to take place when the high pressure cutting oxygen is turned on. This is equally undesirable because it increases metal loss and reduces the uniformity of the scarfed product. The problem of surface irregularity moreover becomes more pronounced after the scarfing units have undergone prolonged operation. The relatively small preheat fuel gas ports become carbonized and partially blocked by particles of slag. This causes surface area portions having only slight high spots to remain unmelted and tends to magnify the problem.

For economy reasons, it has heretofore been found advantageous to construct the scarfing unit so that the same oxygen passage serves to discharge the preheat oxygen flow as well as the cutting oxygen flow. In operation, once the hot spot is formed the cutting oxygen is supplied by increasing the oxygen flow from its preheat value to the cutting value. In addition to substantially reducing the cost of manufacturing the scarfing unit because it has fewer passages, considerable savings are also realized by eliminating the need for a separate oxygen supply system with its associated piping. It has also been found necessary to construct the scarfing unit so that the oxygen and fuel gas discharge openings are maintained a considerable distance above the surface of the steel. This has been necessary in order to reduce damage to the units from projecting scabs and fins on the steel. While it is desirable to maintain this practice, these two features combined have presented a problem which often exists independent of surface irregularity. While noticeable when using acetylene as the fuel gas, the problem is quite severe when other fuel gases are utilized, e.g., natural gas. The difficulty is that the hot spot is formed in most cases in a location which is displaced from the point of contact made by the oxygen stream when it is increased to its high pressure cutting value. Due to the differences in velocity between the preheat gases and the cutting oxygen stream and their discharge height above the steel, it is exceedingly difficult to overcome the problem by redesigning the scarfing unit.

The effect of the above-mentioned problem is that it requires a longer preheating time in order to form a longer hot spot, which also increases the occurrence of gouging when the starting pass is initiated.

It is an object of this invention to provide a method of obtaining full and even desurfacing starts across the surface of a metal body.

Another object is to provide a method of obtaining a desurfacing cut of substantially uniform depth over the desurfaced length of the body.

A further object is to provide a method of obtaining a gouge-free full and even desurfacing start on a steel body having an irregular surface containing high spots and low spots across its width.

A still further object is to provide a method of obtaining fast gouge-free desurfacing starts when using a scarfing unit having a common oxygen discharge passage for preheat oxygen and cutting oxygen and when such unit is operated at a considerable discharge height above the surface of the steel.

According to the present invention a hot metal body is fed into register with a scarfing unit. A flow of preheat oxygen is turned on and directed in a sheet-like stream against the surface of the metal body. A flow of fuel gas is turned on and is directed into the flow of oxygen. The mixture is ignited to produce sheet-like flames which strike and further heat a localized area of the metal body. This surface area is heated by the flames until a puddle of molten metal is formed thereon. As soon as the puddle has formed, the relative horizontal position between the metal body and the scarfing unit is shifted so that the puddle is repositioned further upstream of the scarfing unit. The flow of preheat oxygen is then increased to a cutting oxygen flow rate while the movement of the metal body is immediately brought to scarfing speed.

When the invention is carried out on a cold steel body an adjuvant iron powder is directed into the sheet-like preheat flames and onto the surface of the steel. The preheat flames rapidly bring the powder up to its ignition temperature whereupon it burns in the highly oxidizing atmosphere which is present. This reaction generates sufficient heat to form a puddle of molten metal on the surface of the steel. As soon as the puddle is formed, the relative horizontal position between the steel and the scarfing unit is shifted so that the puddle is repositioned further upstream of the scarfing unit. The flow of preheat oxygen is then increased to a cutting oxygen flow rate while the movement of the steel past the scarfing unit is immediately brought to scarfing speed. At about the same time the flow of adjuvant iron powder is discontinued.

It has been found necessary to reposition the hot spot with respect to the scarfing unit so that it is shifted upstream between 1 and 3 inches. The repositioning causes a lengthening of the hot spot and allows the molten metal by its surface tension to pull itself together over the high spots on the surface of the steel. When the cutting oxygen stream is turned on, it will contact a shallow but fairly even puddle across the surface of the steel and produce a full and uniform gouge-free start. The repositioning step also prevents the cutting oxygen stream from overshooting the hot spot and thus permits a shorter overall preheat period to be used.

According to another embodiment of the invention, the cutting oxygen stream is initiated as the relative position between the puddle and the scarfing unit is being shifted. The flow rate in this case should be intermediate the preheat value and the cutting value until the steel is brought up to scarfing speed. When scarfing speed is reached, the oxygen stream is immediately increased to its full cutting value. The advantage gained by this sequence of operation is that it helps get the scarfing reaction started faster and tends to spread the molten puddle out evenly and quickly upstream of its originally formed location. This further decreases the time needed for preheating and permits a faster gouge-free start.

In the drawings:

FIG. 1 is a plan view of a section of steel having an irregular surface containing high spots and low spots and illustrating their effect when preheated and scarfed in a coventional manner;

FIGS. 1a–1d are cross-sectional views taken through lines A—A to D—D, respectively, of the steel body shown in FIG. 1;

Figure 2:
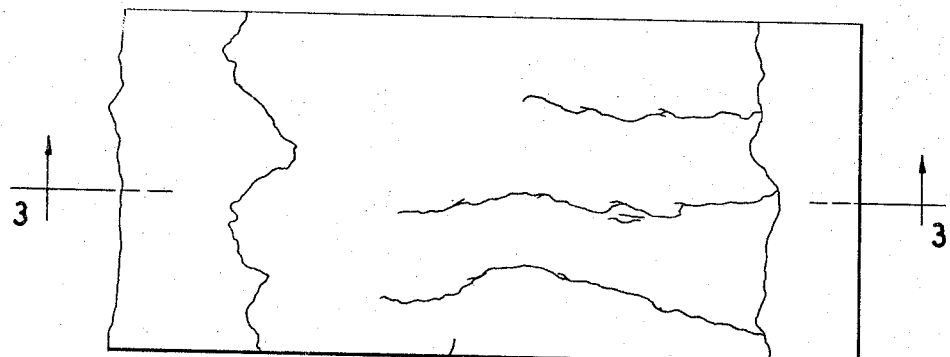
FIG. 2 is a plan view of the steel body shown in FIG. 1 after it has been preheated for an abnormally long period, in order to melt down the irregular high spots shown in FIG. 1 and then scarfed in a conventional manner.

Referring to the drawings, FIG. 1 illustrates a metal body W, having an irregular surface to be scarfed. The body may contain high points P which form separations preventing the formation of a uniform shallow molten metal puddle M, across the width of the body after a normal pre-heating period. The high spots P will cause a typical poor start if a scarfing pass were attempted with the uneven puddle illustrated. FIGS. 1a–1d further illustrate this condition. FIGS. 1a and 1b illustrate the effect of the depth of the puddle upon gouging, depending upon where the cutting oxygen stream initiates the scarfing reaction. FIG. 1c illustrates a condition known as slag blow-back which is undesirable because it leads to fouling of the scarfing units as well as interfering with the quality control of the product. If a scarfing reaction was initiated in the area between the lines C—C and D—D shown in FIG. 1, at least two unscarfed regions P would extend for the entire length of the body. These areas would often require secondary conditioning by hand, e.g., hand grinding, which is undesirable because it is expensive and time-consuming.

Figure 3:
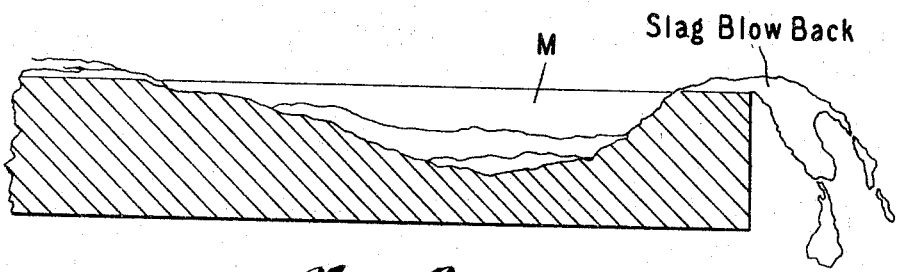
FIG. 3 is a longitudinal sectional view taken along the line 3—3 of FIG. 2.

If the preheat period was extended until all of the high points were melted to form a continuous molten puddle M extending across the width of the body as illustrated in FIG. 2, a heavy gouge would result upon initiating the scarfing reaction, as shown in FIG. 3. As shown therein, while an extended preheat period will melt down the high points on an irregular surface, it will not form a shallow molten puddle of substantially uniform depth. When the high pressure cutting oxygen stream hits the molten puddle, it will often cause a severe gouging at the start in addition to a blow-back of slag. As aforementioned, both of these conditions are detrimental.

Figure 4:
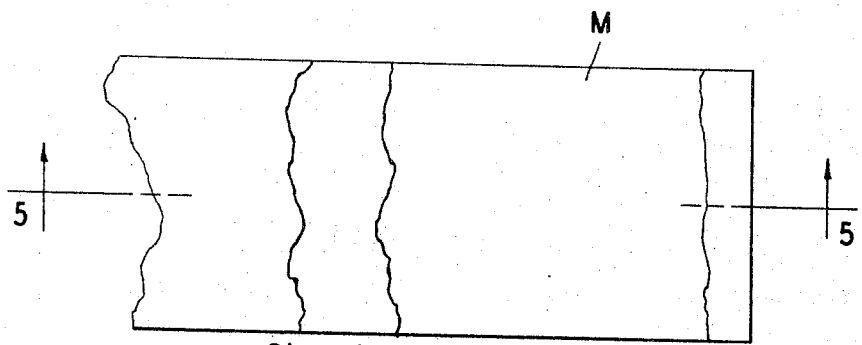
FIG. 4 is a plan view of the steel body shown in FIG. 1 after being preheated and scarfed according to the present invention.
Figure 5:
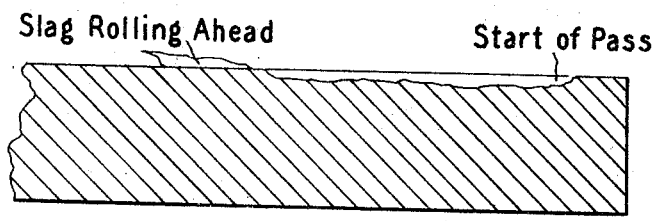
FIG. 5 is a longitudinal sectional view taken along the line 5—5 of FIG. 4.

FIGURES 4 and 5 illustrate a full and uniform gouge-free start without slag blow-back. This type of start was heretofore possible only when the steel to be scarfed had a surface which at the point of starting the scarfing reaction, was substantially free of high spots and low spots. Whenever the steel to be scarfed had an irregular surface, this type of start was heretofore unobtainable on a commercial production basis. The present invention provides a method of obtaining such starts on irregular surfaced steel on a commercial production basis.

Figure 6:
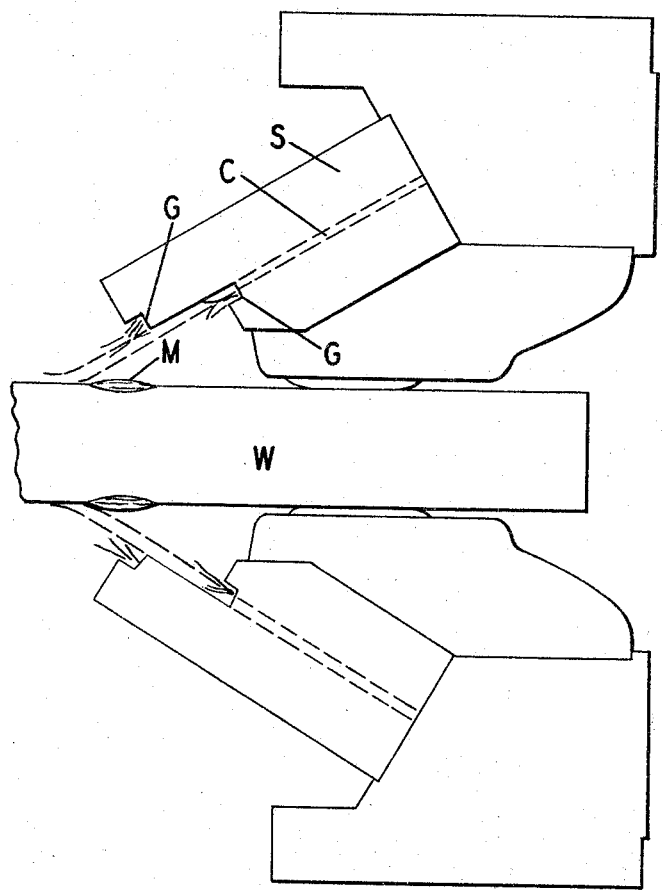
FIG. 6 is a diagrammatic side elevational view of a scarfing unit forming a hot spot on a steel body during the preheating period, according to the present invention.

Referring now to FIG. 6, the hot steel body W is fed into register with a scarfing unit S by a roll table (not shown). The scarfing unit has upper and lower preheat ports G for discharging a fuel gas, and a continuous slotted port C for discharging a sheet-like stream of oxygen therebetween. A flow of preheat oxygen is turned on and directed in a sheet-like stream against the surface of the steel. A flow of fuel gas is turned on and directed into the stream of preheat oxygen. The resulting combustible mixture is ignited to produce sheet-like flames which strike and further heat a localized surface area to form a molten puddle of metal M thereon. When using natural gas as the fuel gas about 320 c.f.h. per inch of surface width of the body is required during the preheating period. During this period between 250 and 850 c.f.h. per inch of body surface width of preheat oxygen is normally required.

Figure 7:
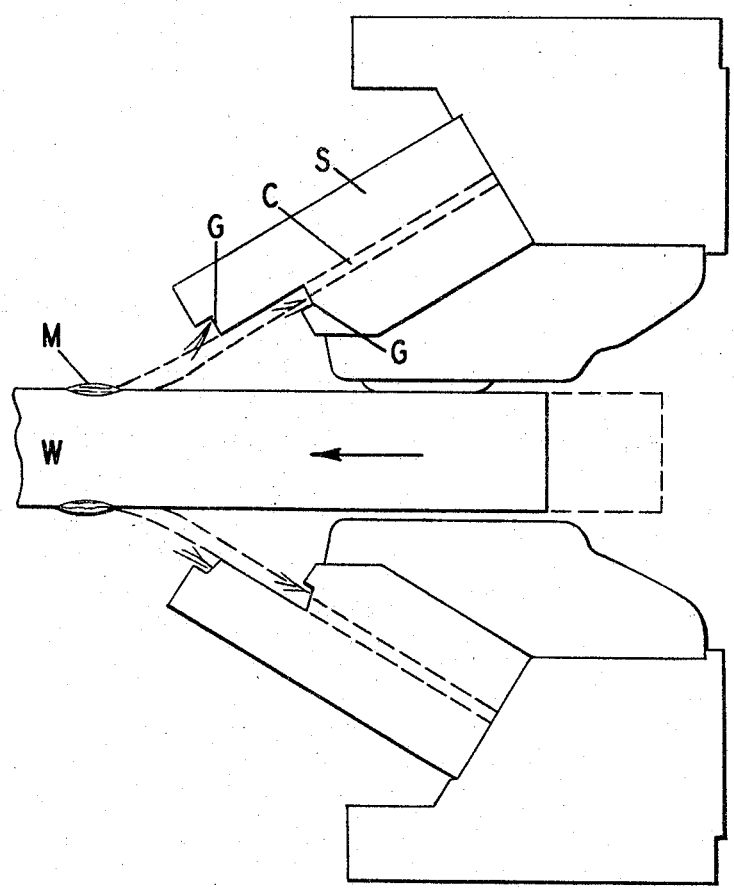
FIG. 7 is a diagrammatic side elevational view of the FIG. 6 scarfing unit showing its position with respect to the originally formed hot spot immediately prior to initiating the scarfing pass.

The preheat flows are maintained at about these rates until a shallow puddle or hot spot is formed. As soon as the puddle is formed, the steel is repositioned as shown in FIG. 7 so that the hot spot is shifted further upstream of the scarfing unit. Usually the hot spot should be displaced about 1–3 inches from its original location with respect to the scarfing unit. This repositioning can be accomplished by a suitable mechanism for backing up the roll table or alternatively by a mechanism for shifting the scarfing unit. As soon as the repositioning has taken place the molten puddle M will be extended in length, but not significantly in depth, until the surface tension of the metal will pull it together over any high spots on the surface of the steel. At this point the flow of oxygen is increased to between about 1700 and 5100 c.f.h. per inch of surface width and the movement of the steel brought to a scarfing speed between about 50 and 150 feet per minute. At this point the flow of fuel gas, if desired, can be decreased to about 170 c.f.h. per inch of surface width.

Figure 8:
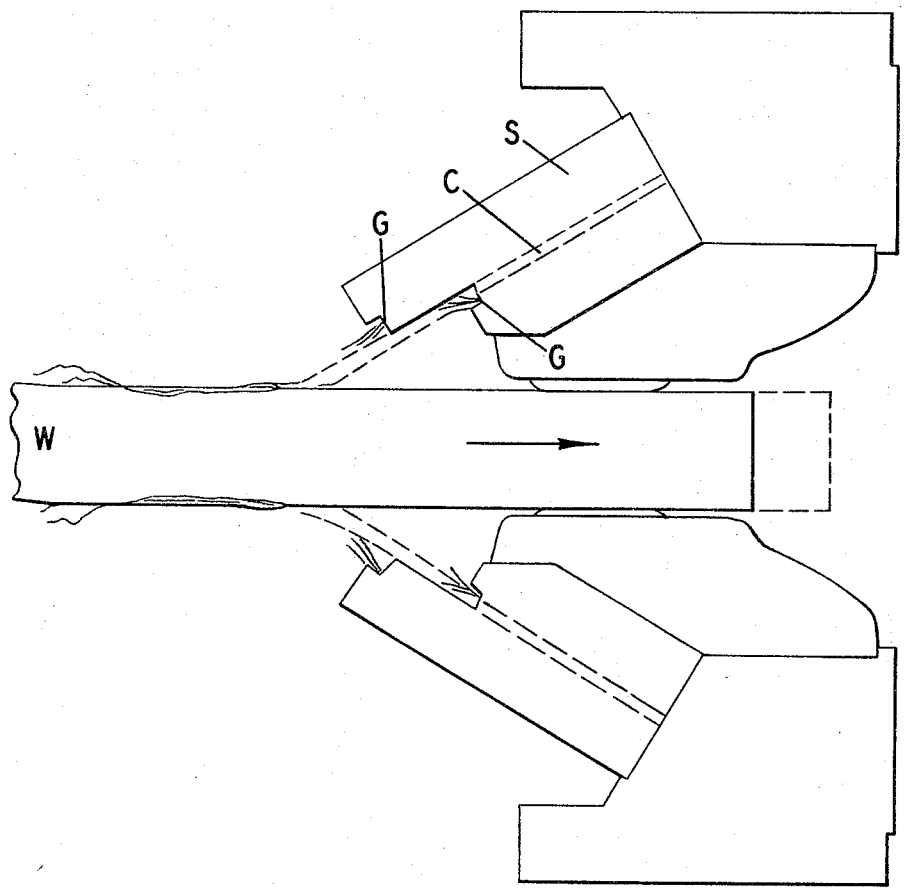
FIG. 8 is a diagrammatic side elevational view of the FIG. 6 scarfing unit after the scarfing pass has been initiated and as the body is moving past the scarfing unit at scarfing speed.

As shown in FIG. 8, the steel body W has been brought to scarfing speed with the scarfing reaction continuing. There is an absence of gouges and slag blow-back.

Alternatively, it has been found desirable to increase the flow of oxygen to a value intermediate its preheat and scarfing value as the steel is being repositioned. A flow rate of about 1500 c.f.h. per inch of body surface width during the reversing step has been found satisfactory. As aforementioned, this procedure facilitates the making of faster full and uniform starts by generating additional heat while spreading the puddle outward toward the sides of the body.

Figure 9:
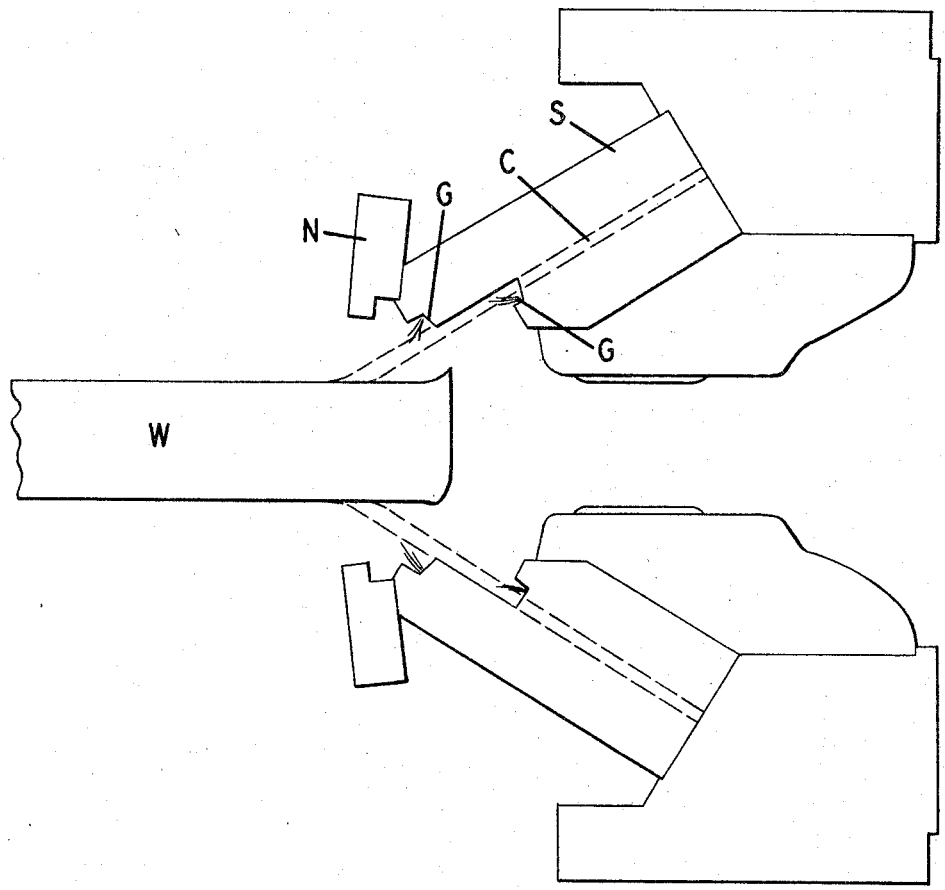
FIGS. 9–11 are diagrammatic side elevational views similar to FIGS. 6–8 illustrating the method of the present invention when scarfing cold steel.
Figure 10:
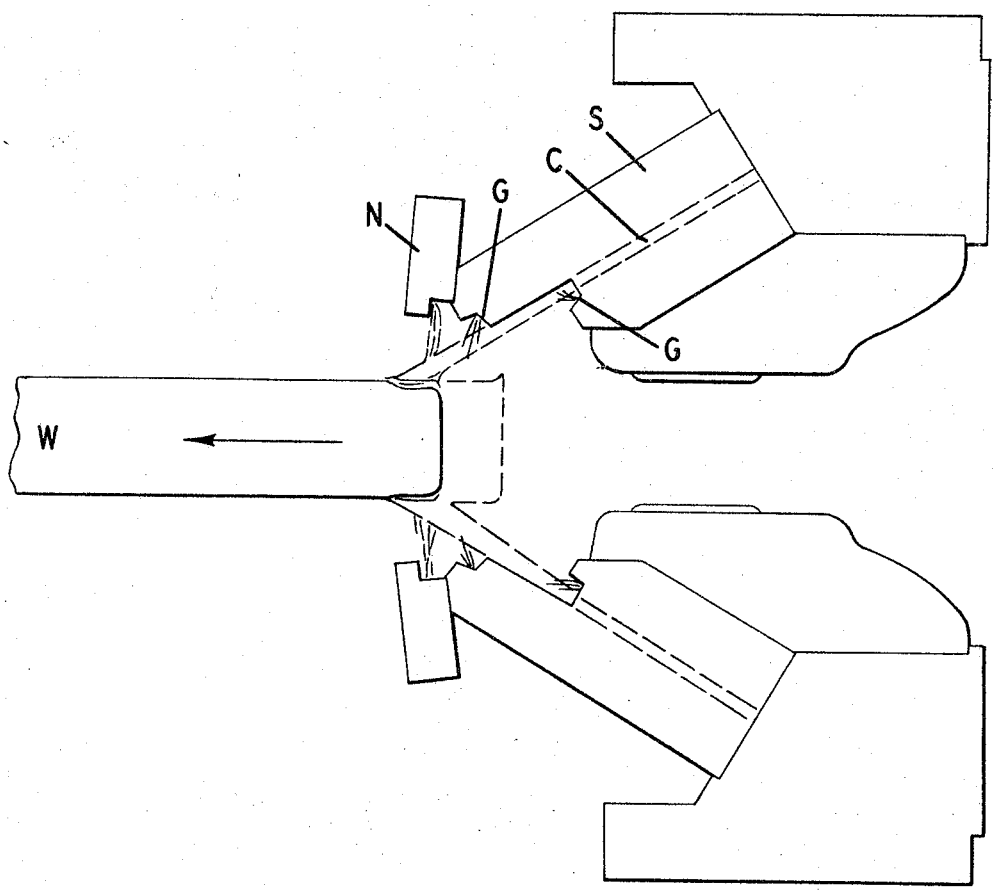
Figure 11:
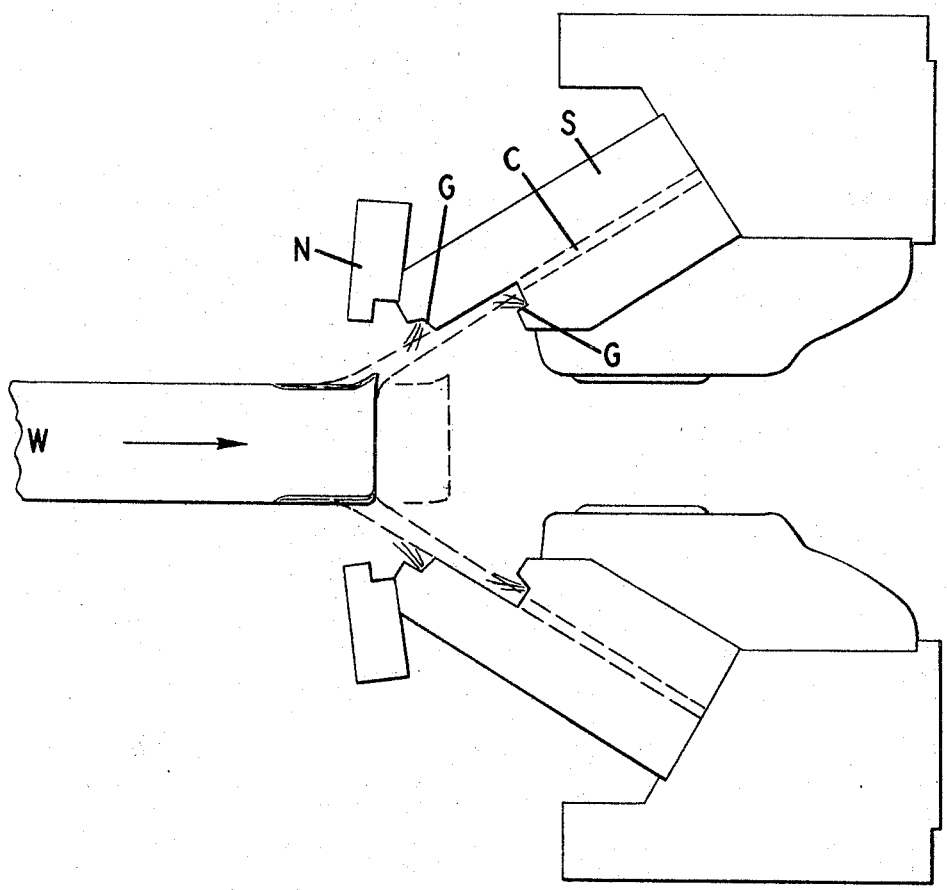

FIGS. 9–11 illustrate the sequence of operation according to the present invention when applied to cold scarfing. As shown in FIG. 9, iron powder from powder nozzle N is injected into the preheat flames and onto the surface of the steel. About 1–2 pounds per minute of iron powder is required, however, it usually isn't necessary to continue the flow of iron powder for more than a few seconds. The steel body W as shown in FIG. 9 has a sheared end which normally is very difficult to start close to. By repositioning the steel and utilizing an intermediate oxygen rate as described for hot scarfing it is possible to obtain full and uniform gouge-free starts beginning at the end of the steel. FIGURES 10 and 11 show the repositioning step and the scarfing step, respectively. As shown in FIG. 11, the powder is shut off during the scarfing pass. Proper scarfing speed when operating on cold steel is between about 25 and 75 feet per minute.

What is claimed is:

1. In a method of thermochemical scarfing a metal body wherein sheet-like preheat flames are first directed from a scarfing unit against a localized area of the surface to be scarfed at a point in from the end of the body until a puddle of molten metal is formed upon the surface thereof, and thereafter a sheet-like stream of scarfing oxygen is directed against said puddle and the metal body is moved relative to said stream of scarfing oxygen, the improvement which comprises shifting the relative horizontal position between said body and said scarfing unit, after said molten metal puddle has been formed but before said stream of scarfing oxygen has been directed at said molten puddle, so that said molten metal puddle is repositioned further upstream of said scarfing unit.

2. In a method of thermochemical scarfing a metal body wherein a flow of preheat oxygen is initiated and directed from a scarfing unit in a sheet-like stream against the surface to be scarfed, a flow of fuel gas is initiated and directed into said flow of preheat oxygen and the mixture thereof is ignited to form sheet-like preheat flames which strike and heat a localized area of said surface until a molten metal puddle is formed, and thereafter the flow of said preheat oxygen is increased to a cutting oxygen flow rate and the movement of the body is brought up to scarfing speed past said scarfing unit for scarfing the remainder of the body, the improvement which comprises: shifting the relative horizontal position between said body and the scarfing unit, after said molten metal puddle has been formed but before said stream of preheat oxygen has been increased to a cutting oxygen flow rate, so that said molten metal puddle is repositioned slightly further upstream of the scarfing unit.

3. A method as claimed in claim 1 wherein said body is repositioned such that said molten metal puddle is shifted upstream between 1 and 3 inches.

4. A method as claimed in claim 2 wherein said flow of preheat oxygen is between about 250 and 850 c.f.h. per inch of body surface width and said cutting oxygen flow rate is between 1700 and 5100 c.f.h. per inch of said body surface width.

5. A method as claimed in claim 2 wherein natural gas comprises said fuel gas and is supplied at a flow rate during preheating of about 320 c.f.h. per inch of body surface width.

6. A method of thermochemically scarfing a hot steel body which comprises feeding the body into register with a scarfing unit, initiating a flow of preheat oxygen and directing said flow in a sheet-like stream against the surface thereof to be scarfed, initiating a flow of fuel gas and directing it into said flow of preheat oxygen, igniting the same so as to form sheet-like flames which strike and heat a localized area of the surface of said body, continuing the heating of said surface until a puddle of molten metal is formed thereon, shifting the relative horizontal position between said body and said scarfing unit so that said puddle is repositioned further upstream of said scarfing unit, simultaneously increasing the flow of oxygen to a value intermediate the preheat value and the normal cutting value as said body is being repositioned, and increasing the flow rate of said oxygen stream to a cutting flow rate while bringing the movement of said body to a scarfing speed, for scarfing the remainder of the body.

7. A method as claimed in claim 6 wherein said preheat oxygen flow rate is between 250 and 850 c.f.h. per inch of body surface width, said cutting oxygen flow rate is between 1700 and 5100 c.f.h. per inch of body surface width and said scarfing speed is between 50 and 150 feet per minute.

References Cited
UNITED STATES PATENTS

| | | | |
|---|---|---|---|
| 2,267,405 | 12/1941 | Jones et al. | 148—9.5 |
| 2,290,295 | 7/1942 | Scheller | 148—9.5 |
| 2,493,802 | 1/1950 | Bucknam et al. | 148—9.5 |
| 3,230,116 | 1/1966 | Wandelt | 148—9.5 X |

DAVID L. RECK, *Primary Examiner.*

C. N. LOVELL, *Assistant Examiner.*